(12) United States Patent
Wyman et al.

(10) Patent No.: US 7,106,891 B2
(45) Date of Patent: Sep. 12, 2006

(54) SYSTEM AND METHOD FOR DETERMINING CONVERGENCE OF IMAGE SET REGISTRATION

(75) Inventors: Bradley Wyman, Kirkland, WA (US); Lydia Ng, Seattle, WA (US)

(73) Assignee: Insightful Corporation, Seattle, WA (US)

( * ) Notice: Subject to any disclaimer, the term of this patent is extended or adjusted under 35 U.S.C. 154(b) by 618 days.

(21) Appl. No.: 10/063,834

(22) Filed: May 16, 2002

(65) Prior Publication Data

US 2006/0165267 A1    Jul. 27, 2006

Related U.S. Application Data

(60) Provisional application No. 60/329,828, filed on Oct. 15, 2001.

(51) Int. Cl.
   *G06K 9/00* (2006.01)
(52) U.S. Cl. .................. 382/128; 382/294; 382/295
(58) Field of Classification Search ............... 382/128, 382/294, 295
   See application file for complete search history.

(56) References Cited

U.S. PATENT DOCUMENTS

| 5,611,000 | A  | * | 3/1997  | Szeliski et al. .......... 382/294 |
| 5,633,951 | A  | * | 5/1997  | Moshfeghi ............... 382/154 |
| 6,009,212 | A  | * | 12/1999 | Miller et al. ............. 382/294 |
| 6,539,127 | B1 | * | 3/2003  | Roche et al. ............. 382/294 |
| 6,718,055 | B1 | * | 4/2004  | Suri ....................... 382/128 |
| 2002/0186425 | A1 | * | 12/2002 | Dufaux et al. ........... 358/497 |

OTHER PUBLICATIONS

Viola, P., Wells, W.M. III; "Alignment by Maximization of Mutual Information"; IEEE; 1995.*

* cited by examiner

*Primary Examiner*—Joseph Mancuso
*Assistant Examiner*—Craig Kronenthal
(74) *Attorney, Agent, or Firm*—DLA Piper Rudnick Gray Cary US LLP

(57) ABSTRACT

Computer-based methods and systems for automatically determining convergence when registering image sets are provided. Example embodiments provide an Enhanced Image Registration System (EIRS), which includes an Image Comparison Module, a Transformation Optimizer, and a Convergence Calculator. When the EIRS receives two image sets to align, the Image Comparison Module compares two image sets to determine or measure how closely the image sets are aligned. The Transformation Optimizer determines an appropriate transformation to apply to one of the image sets to align it with the reference image set. The Transformation Optimizer then applies the determined transformation. The Convergence Calculator examines one or more points within the transformed image set to determine when convergence is attained.

53 Claims, 9 Drawing Sheets

SYSTEM AND METHOD FOR DETERMINING CONVERGENCE OF IMAGE SET REGISTRATION

CROSS REFERENCE TO RELATED APPLICATIONS

This application claims priority under 35 U.S.C. § 119(e) to provisional application No. 60/329,828, filed Oct. 15, 2001, entitled 'A System and Method for Determining Convergence of Image Sets,' which is hereby fully incorporated by reference.

FEDERAL RESEARCH STATEMENT

This invention was made with government support under Contract No. N01-LM-0-3504 awarded by National Library of Medicine. The government has or may have certain rights in this invention.

BACKGROUND OF INVENTION

1. Field of the Invention

The present invention relates to a method and system for determining convergence in an optimization system, and in particular, to methods and systems for determining convergence when registering sets of images.

2. Description of the Related Art

Medical imaging has taken on an ever increasing, if not vital, importance as a component in research and diagnostic applications in current clinical settings. The application of medical imaging can be found in the areas of planning, implementing and evaluating surgical and radio-therapeutical procedures. Imagining modalities generally fall within two categories: anatomical and functional. Anatomical modalities (i.e. depicting primarily morphology) include among others X-ray, computed tomography (CT), Magnetic Resonance Imaging (MRI), Ultrasound (US), portal images and video sequences obtained by various means, such as laparoscopy or laryngoscopy.

It should be noted that derivative techniques can also be detached from the original modalities and may appear under a separated name, such as Magnetic Resonance Angiography (MRA), Digital Subtraction Angiography (DSA), Computed Tomography Angiography (CTA) and Doppler.

Functional modalities depict data or information focused primarily on the metabolism of the underlying anatomy. It includes Single-photo Emission computed Tomography (SPECT), scintigraphy and Positron Emission Tomography (PET) (that generally constitutes the nuclear medicine imaging modalities) and fMRI (functional MRI) as well as a host of other modalities.

The information acquired from multiple imaging modalities in a clinical setting is normally of a complementary nature. A proper integration of this complementary data from the separate image sets, wherein an image set is a collection of related images, usually of the same modality and usually acquired during a single scanning session, is desired, if not required, to extract the most amount of information from the image sets. It should be noted that the image set may have been taken later in time and the time difference may be the only difference between the image set(s). This frequently occurs in situations where the growth or reduction in a cell mass is being tracked to determine if a particular treatment regimen is effective or not.

The initial step in the integration of data contained in the image sets is to bring the modalities involved into spatial alignment. This procedure is referred to as registration. After registration a fusion step is generally preformed, to provide an integrated display of the data present in the image sets.

Generally, in the registration process an image set is used as a reference while a transformation is applied to subsequent image sets in order to align any common subject matter between the image sets to match the reference set. While a variety of image registration methods exist they generally include five basic aspects: defining permissible transformations, selection of the matching features, the specification of an evaluation measure, specification of an optimization strategy and a determination as to when the search for proper alignment has converged adequately enough to be terminated.

Permissible transformations of a subsequent second image set is typically defined by an image registration process in order to specify the anticipated adjustments necessary to align the image sets. A transformation is defined as a set of movements applied to an image set, such as deformable, affine, rigid and perspective. Deformable transformations permit local deformations to the image. For example, deforming a cube into a sphere. Affine transformations (in 3D) have twelve degrees of freedom permitting translations, rotations, skewing and scaling in each of the x-, y- and z-directions. Rigid transformations provide only translations and rotations for a total of six degrees of freedom in 3D images. Perspective transformations map between images of different dimensions, for example mapping a 3D image onto a 2D image or surface.

In addition, the image registration process typically allows a user to select matching features. The matching features are the image elements that are extracted for comparison. Generally these are subdivided into voxel-based or feature-based. Voxel-based matching uses the voxel (or pixel) gray-level intensity values for comparison. Feature-based matching uses a higher-level image processing technique to extract some element of the image, for example edges.

The image registration process also typically defines an evaluation measure to determine the closeness of the match between two images. Several strategies exist for this measure and these depend on the image features being used for the match. While many features and measures exist, one of the most popular is a measure of mutual information ("MI") to determine the closeness of fit between the gray-level intensities between two images. Some of the advantages of MI over other strategies is that it is robust, fast and can work with images that have different gray level intensity mappings such as those found in cross modality medical imaging. Cross modality medical imaging relates to processing medical images from multiple acquisition modes. For example, MI can be used for evaluation when comparing magnetic resonance images (MRI) to computed tomography (CT) images.

Since it is prohibitively time intensive to examine all possible combinations of transformations between two image sets, it is desirable for an image registration system to intelligently constrain the number of transformations performed. An optimization strategy determines the next transformation to apply in order to better align the images during a subsequent iteration. A good optimization technique will result in quick movement towards an optimal alignment. Many methods exist, examples of which are Powell's method and steepest ascent, discussed in Maes, F., et al., "Multimodality image registration by maximization of mutual information". IEEE Transactions on Medical Imaging, 1997. 16(2): p. 187–198 and Wells, W. M. I., et al., "Multi-modal volume registration by maximization of mutual information". Medical Image Analysis, 1996. 1(1): p. 35–51, respectively, incorporated by reference herein.

A successful image registration process also needs to determine when the alignment search has converged adequately enough to terminate the search. Existing systems often employ one of two strategies. The first strategy requires setting the number of iterations to a fixed value that is large enough to ensure convergence. Problems with this strategy are that setting too large of a value results in slow convergence, while setting the value too low results in a loss of robustness as some data sets may not converge. The second strategy examines one or more parameters, usually the evaluation measure, and determines when it has converged. This is the approach used by Powell's method, which terminates after the step size of the evaluation measure falls below some threshold (t). A problem with this strategy is that the evaluation measure may be "noisy" (a graph of the evaluation measure over time does not follow a smooth path and is very noisy), especially in the case of stochastic approximation of the mutual information. It then becomes difficult to determine convergence without a large windowed smoothing function. Another problem is that the evaluation measure often gets trapped in local minima, resulting in a false determination of convergence. For example, a graph of the evaluation measure may have one or more small areas with little change that may be misinterpreted by the system as indicative of convergence. Another method uses a measure that combines MI and gradient information. This method is described in detail in Pluim, J. P. W., J. B. A. Maintz, and M. A. Viergever, entitled "Image registration by maximization of combined mutual information and gradient information". IEEE Transactions on Medical Imaging, 2000. 19(8): p. 809–814, incorporated by reference herein in its entirety.

The prior art and conventional wisdom have failed to provide a method that is easy to utilize while facilitating diverse convergence criteria for myriad users. The prior art is further deficient in that it focuses on only a few of the components that can indicate convergence while omitting many parameters that may not have converged or converged sufficiently.

The prior art is further deficient and lacking in that it does not take into consideration, and addresses the problem by avoiding it, the interplay between different parameters, for instance, by setting the translation movement to be bound but it does not quantify or attempt to quantify the convergence criteria for rotation or skewing. Based upon the initial selection, the other parameters which at the onset were thought to be minor can have a significant effect on convergence prediction and may even dominate the convergence prediction.

SUMMARY OF INVENTION

The present invention has been made in view of the above circumstances and can be characterized according to an aspect of the present invention as a method for registering a plurality of image sets utilizing windowing and the limiting convergence to a predetermine set of iterations.

A further aspect of the present invention can be characterized as a software product capable of registering a plurality of image sets utilizing widowing and limiting convergence to a predetermined set of iterations.

An additional aspect of the present invention can be characterized as a system and method for registering a plurality of image sets and determining convergence, the system and the method including a) calculating a convergence value (V) for a predetermined number of iterations (i), and storing each convergence value to the memory and b) repeating step (a), if a total number of iterations (i) performed $\leq N$ and the convergence value $(V) \leq (t)$, wherein (t) is a threshold value.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

Embodiments and aspects of the embodiments of the present invention provide improved methods and systems for determining convergence when registering image sets. Example embodiments provide an Enhanced Image Registration System (EIRS) that transforms one image set to align with another image set and efficiently determines when the image sets are aligned. The EIRS determines convergence based on a measured "magnitude of transformation" over multiple transformation iterations. The "magnitude of transformation" is a measurement of the impact of a transformation on one or more specific points within the transformed image.

In one embodiment, the EIRS comprises an Image Comparison Module, a Transformation Optimizer and a Convergence Calculator. The Image Comparison Module compares two image sets to determine or measure how closely the image sets are aligned. The Transformation Optimizer determines an appropriate transformation to apply to one of the image sets in an attempt to increase the alignment between the image sets. The Transformation Optimizer then applies the determined transformation. The Convergence Calculator examines one or more points within the transformed image set and determines when convergence of the alignment process is reached.

In one embodiment, voxel-based matching is performed against the image sets. In another embodiment, feature-based matching is performed. In one embodiment, mutual information is used to determine the closeness of fit between the gray level intensities between two image sets.

In another embodiment, deformable transformations are applied to one image set to align it with a reference image set. In another embodiment, affine transformations are applied to the image set. In yet another embodiment, rigid transformations are applied to the image set to align it with the reference image set.

In still another embodiment perspective transformations are applied to the image set to align it with the reference image set.

In a further embodiment, the image sets each comprise only one image. In another embodiment, the image sets each comprises multiple images. In some embodiments, the image sets comprise one or more two-dimensional images, while in other embodiments, the image sets comprises one or more three-dimensional images. As noted, image sets can be one or more images or anatomical or functional data derived from the object in question or from baseline information taken from a reference or library image or a scan from another time point.

Convergence is determined based on how the applied transformation(s) affect one or more specific points within the transformed image set. In one embodiment, the specific points that are examined are the eight corner points of a stack of two-dimensional or three-dimensional images. In another embodiment, the specific points comprise one or more of a center point, points equally spaced along the edges of the image set, points equally spaced along the faces of the image set and random points selected throughout the image set. In another embodiment, the specific points are those points that are most sensitive to the implemented transformation such as corner points. The choice of points can also be done randomly. Choosing location points to be evaluated that yield the most information upon the occurrence of a transformation should yield a faster convergence.

In an alternate embodiment, the affect of the applied transformation is calculated by comparing the location of specific points within the transformed image set before and after the transformation is applied. In another embodiment, the affect of the applied transformation is calculated by comparing the location of specific points within the transformed image set with one or more fixed reference points. Any of the set of image sets may be taken as the reference set and the evaluation image set. Also, the fixed reference point can be selected from either of the reference or the evaluation image set or any other arbitrary location.

The reader should note that the use of the terms reference and evaluation image sets are only utilized for convenience sake in keeping track of the image set that is being used as the non-moving image set in the calculations. Both image sets could be transformed simultaneously or separately. The focus of the present invention is to bring the images into alignment or as close to perfect alignment as possible based on common subject matter. It should also be noted that common subject matter is defined as the subject matter of the images that spatially overlaps the subject matter of another image set. Image sets include the measure of and quantification of the underlying functional and anatomical properties of the object.

In an alternate embodiment, the calculated affect of the transformation on the specific points is low-pass filtered over several iterative transformations. In some embodiments, the noise of the calculated affect of the transformations is determined using a high-pass filter. In alternate embodiments, convergence is determined when the slope of the low-pass filtered calculated affect of the transformation is below a specified threshold (t) across a specified number of transformation iterations ($L_3$).

BRIEF DESCRIPTION OF DRAWINGS

The accompanying drawings, which are incorporated in and constitute a part of this specification, illustrate several embodiments of the invention and together with the description serve to explain the principles of the invention.

DETAILED DESCRIPTION

Figure 1:
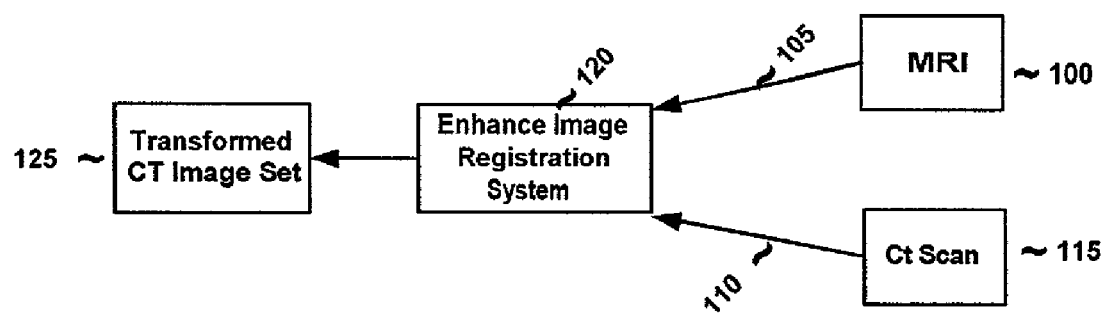
FIG. 1 is an example block diagram of an example implementation of an Enhanced Image Registration System of the present invention.

Reference will now be made in detail to the present embodiments of the invention, examples of which are illustrated in the accompanying drawings. Wherever possible, the same reference numbers will be used throughout the drawings to refer to the same or like parts (elements).

In accordance with the invention, the present invention includes a method for registering a plurality of image sets, wherein each of the plurality of image sets includes at least one image, and wherein each of the plurality of image sets contain spatially overlapping areas of an imaged subject with at least one of the remaining plurality of the image sets. The method further including selecting a reference image set and an evaluation image set from the plurality of image sets, wherein the evaluation image set is to be aligned with the reference image set and wherein any of the plurality of image sets are selectable as the reference image set and the evaluation image set.

A methodology for comparing the registration between the reference image set and the evaluation image set is selected and one or more point locations on the evaluation image set for tracking image movement are selected. The method further selects one or more fixed reference points for comparison with the one or more point locations on the evaluation image set and applies transformations to the evaluation image set for aligning the evaluation image set with the reference image set. The method also a) calculates a quality of alignment between the reference image set and the evaluation image set using the selected feature set, b) calculates a location value (C) from one or more points on the evaluation image set with respect to the selected one or more fixed reference points and storing the calculation in the memory, and c) calculates a next transformation to apply to the evaluation image. In step d) the transformations are applied to at least a subset of the evaluation image set and step e) calculates a convergence value (V) for the current iteration (i) and stores the convergence value to the memory. Step (f) then performs steps (a), (b) (c), (d) and (e) until at least $L_5$ (minimum number) correspondence calculation iterations have been performed, and step (g) repeats steps (a), (b), (c), (d) and (e) if a totalnumber of iterations (i) performed $\leq N$ and the convergence value $(V) \leq (t)$, wherein (t) is a threshold value.

Quality of alignment is defined as the relative measure between different alignments of the images. Furthermore, there are numerous methodologies utilized to determine Quality of alignment such as Mutual Information, Cross-Correlation and various well known feature extraction methods.

Embodiments of the present invention provide improved methods and systems for determining convergence when registering image sets. Example embodiments provide an Enhanced Image Registration System (EIRS) that transforms one image set to align it with another image set and efficiently determines when the image sets are aligned. The EIRS determines convergence based on a measured "magnitude of transformation" or movement (i.e. is there still movement between the current transformation iteration and any previous transformation iteration) over multiple transformation iterations. The "magnitude of transformation" is a measurement of the impact of a transformation on one or more specific points within the transformed image. The specific points that are examined are configurable and are preferably those points most sensitive to change based on the applied transformation. For example, given a stack of images and applying affine transformations, the 8 corner points of the stack are most sensitive to the applied transformations, and thus are the most appropriate points to examine when searching for convergence.

FIG. 1 is an example block diagram of an example implementation of an Enhanced Image Registration System ("EIRS"). In the medical field, Magnetic Resonance Images (MRI) may be acquired using different parameter settings or two different types of image sets (e.g., MRI and Computed Tomography) may be acquired, resulting in multiple image sets of the same physical structure (e.g., a patient's head). MRI used as an example, but invention not limited to any particular imaging modality. Registering one image set to correspond with another results in two image sets that are aligned and that allow, for example, a physician to view both image sets simultaneously such that essentially the same "slice" of the structure is viewable in each set.

In the example shown in FIG. 1, the EIRS 120 receives a set of Magnetic Resonance Imaging ("MRI") 105 from an well known MRI device 100. It should be noted that a variety of other images could be captured and transformed and that the operation could be performed in reverse. The EIRS 120 also receives a set of Computed Tomography ("CT") images 110 from a well known CT Scanner 115. For the purposes of this example, the MRI image set 105 is used as the reference image set and the CT image set 110 is transformed to align with it. The EIRS 120 compares the two image sets, performs multiple transformation iterations on the CT image set 110 to align it with the MRI image set 105, determines when the images are sufficiently aligned (when the magnitude of the transformation has converged) using convergence techniques of the present invention and generates a transformed CT image set 125 that is aligned with the MRI image set 105.

Although the convergence techniques are described herein for use in image registration for medical imaging, one skilled in the art will appreciate that these techniques can also be used for registering any sets of 2D or 3D images. For example, Land-Satellite imaging, pathology slides, scanned document images and multi-band color images may be registered using the invention.

Figure 2:
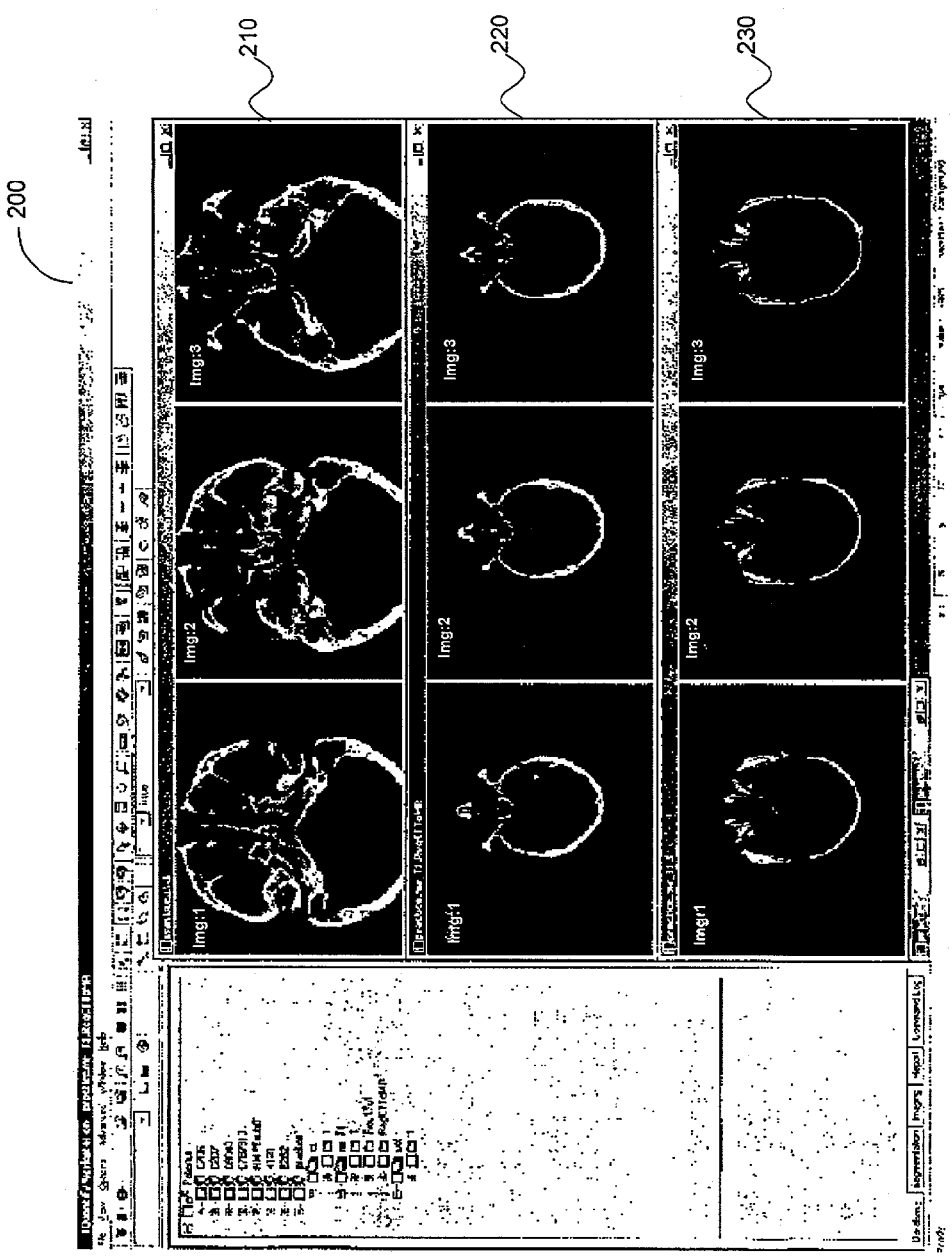
FIG. 2 is an example screen display of pre-registration and post-registration image sets as viewed using a user interface of the EIRS of the present invention.

FIG. 2 is an example screen display of pre-registration and post-registration image sets 200 as viewed using a user interface of the EIRS. The bottom row 230 shows three images (e.g., "slices") from an MRI image set of a patient's head. The top row 210 displays three images (e.g., "slices") from a CT scan image set of the same patient's head. Visually comparing the top row to the bottom row, three distinct differences may be noted. First, the CT image set 210 is larger (e.g., "zoomed in") than the MRI image set 230. Second, the CT image set 210 is rotated clockwise in comparison to the MRI image set 230. Finally, the CT image set 210 is not at the same depth or slice level as the MRI image set 230, that is, the physical structures visible in Img:1 of the CT image set 210 are not the same structures visible in Img:1 of the MRI image set 230. Specifically, Img:1 of the CT image set 210 is a slice closer to the patient's neck, while Img:1 of the MRI image set 230 is a slice closer to the top of the patient's head. The middle row 220 shows three images from the transformed CT image set generated by the EIRS. In this example, the CT image set 210 has been registered to align it with the MRI image set 230, resulting in the transformed CT image set 220.

The three distinct differences noted above are corrected in the transformed CT image set 220. First, the transformed CT image set 220 is smaller (e.g., "zoomed out") than the original CT image set 210. It should be noted also that the size of the transformed images are now the same as the size of the corresponding images in the MRI image set 230. Second, the edges visible in the images indicate that the transformed CT image set 220 is rotated counter-clockwise with relationship to the original CT image set 210, thus directionally aligning it with the MRI image set 230. Finally, the physical structures visible in the corresponding slices of the transformed CT image set 220 and the MRI image set 230 appear to be more similar than the physical structures visible in the corresponding slices of the original CT image set 210 and the MRI image set 230.

Figure 3:
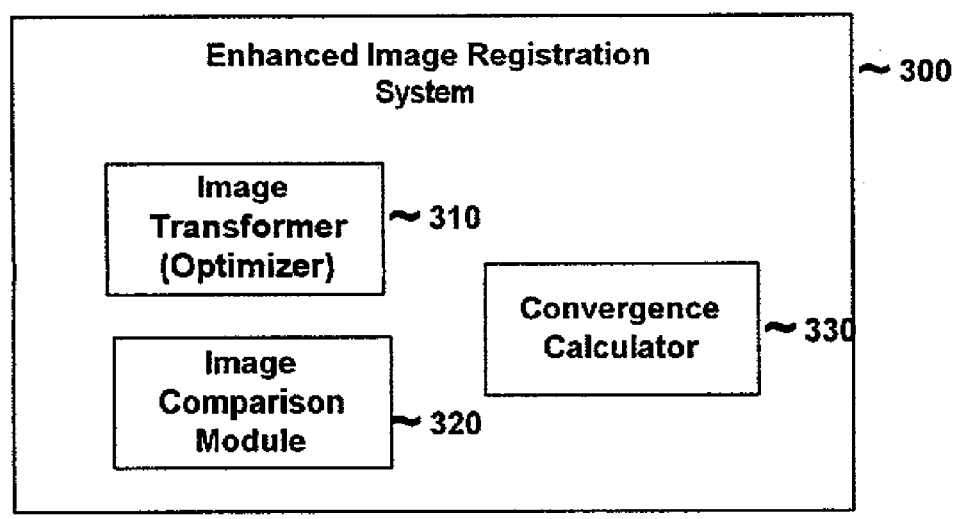
FIG. 3 is an example block diagram of the components of an Enhanced Image Registration System of the present invention.

FIG. 3 is an example block diagram of the components of an Enhanced Image Registration System ("EIRS"). The EIRS 300 includes a Transformation Optimizer 310, an Image Comparison Module 320 and a Convergence Calculator 330. The Image Comparison Module 320 examines corresponding images from two image sets and determines whether or not the image sets are aligned. The Transformation Optimizer 310 determines an appropriate transformation and applies the transformations to one image set to more closely align it with a reference image set. The Convergence Calculator 330 determines the magnitude of the transformations that have been performed by the Transformation Optimizer 310 and determines when the transformation magnitude has converged, which indicates that the image sets are sufficiently aligned. This is usually done by comparing the convergence value against a predetermined threshold (t) which can range from zero (perfect alignment) to any value greater than zero. In some applications it may be instructive to find the least convergent point or points between the images. This may arise in the case of a fast growing cancer or tumor and these regions are intended to be identified while the remaining structures remain relatively constant.

Figure 4:
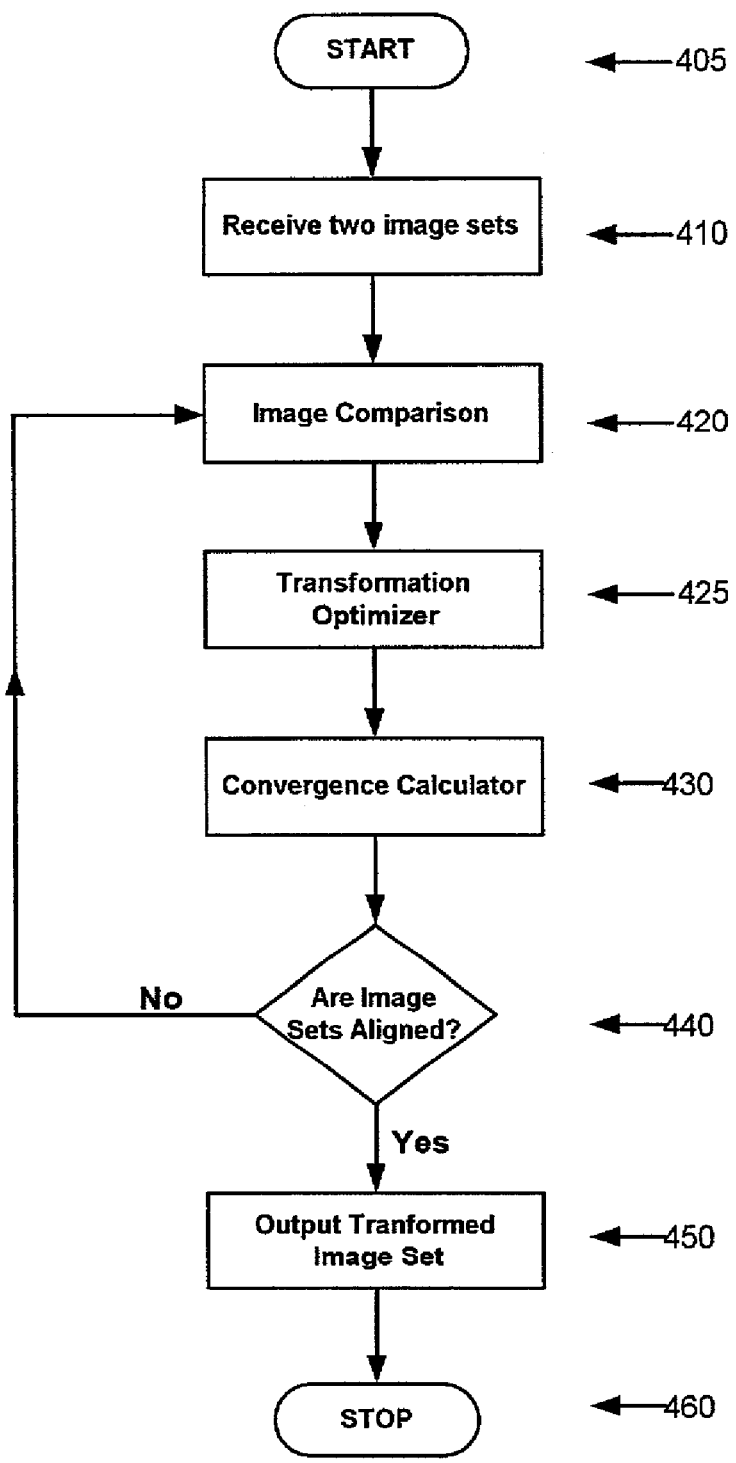
FIG. 4 is an example flow diagram of the steps performed by an example Enhanced Image Registration System when registering one image set to another of the present invention.

FIG. 4 is an example flow diagram of the steps performed by an example Enhanced Image Registration method 405 when registering one image set to another. In step 410, the EIRS receives as input two image sets. One skilled in the art will recognize that each image set may comprise one or more images, each image having one or more dimensions and that the registration may be performed with respect to one or more dimensions, acquisition orientation, or time differences. In addition, one skilled in the art will recognize that the described process may be extended to bring an arbitrary number of images or image sets into alignment. In step 420, the Image Comparison Module of the EIRS compares the image sets to determine whether or not they are aligned.

Two example types of image comparison that can be used are voxel-based and feature-based comparisons. Voxel-based image comparison is a comparison of the voxel (pixel) gray level intensity values. Feature-based image comparison employs higher-level image processing techniques such as the Sobel operator (performs a 2-D spatial gradient measurement on an image and so emphasizes regions of high spatial gradient that corresponds to edges) to extract and compare image elements, such as edges. The example discussed herein utilizes voxel-based comparison, but one skilled in the art will recognize that any comparison technique may be used with the convergence techniques of the methods and systems of the present invention. Voxel-based image comparison techniques are further discussed in detail in Studholme, C., D. L. G. Hill, and D. J. Hawkes, entitled "Automated 3D registration of truncated MR and CT images of the head". Proc. British Machine Vision Conf., 1995: p. 27–36 and Collignon, A., et al., entitled "Automated multimodality medical image registration using information theory, in Proc. 14th Int. Conf. Information Processing in Medical Imaging; Computational Imaging and Vision 3", Y. Bizais, C. Barillot, and R. Di Paola, Editors. June 1995, Kluwer: Boston. p. 263–274, which are incorporated by reference herein in their entirety.

In step 425, a Transformation Optimizer component of the EIRS determines and applies a transformation to the second image set to assist in aligning it with the first image set. To aid in aligning the images, transformation is generally selected to better align the images—it should be noted that sometimes more information can be learned regarding convergence by selecting a transformation that causes the alignment to worsen. There are two components to this step. First, is the determination of the type of transformation to be applied to the images; the second is the optimization method which determines the direction and magnitude of the transformation step to be applied to the image set.

The type of transformations applied to the image set may be, for example, deformable, affine or rigid. Rigid transformations comprise translations and rotations, which allow six degrees of freedom when transforming a three-dimensional image. Affine transformations comprise translations, rotations, skewing and scaling, which allow 12 degrees of freedom when transforming a three-dimensional image. Deformable transformations further allow local deformations to an image. The example implementation discussed herein incorporates the use of affine transformations, but one skilled in the art will recognize that any transformation method may be employed with the convergence techniques of the methods and systems of the present invention.

An optimization aspect of the Transformation Optimizer step 425, employs an optimization method to determine the exact transformation to apply to an image set. Two example optimization methods are Powell's method and gradient descent, discussed in "Multimodality image registration by maximization of mutual information", and Viola, P. and Wells, W. M. III, entitled "Alignment by maximization of mutual information", International Journal of Computer Vision. 1997: p. 1 37–154, both of which are hereby incorporated by reference. Although the example implementation described herein incorporates gradient descent, one skilled in the art will recognize that any optimization method, including but not limited to a Levenberg-Marquardt optimizer, a conjugate gradient optimizer and a quasi-Newton optimizer, may be used with the convergence techniques of the methods and systems of the present invention.

In step 430, the Convergence Calculator component of the EIRS determines, based on the image comparison, whether or not the image sets have converged to a solution indicating alignment. If the image sets are determined to be aligned (i.e., the image sets are in optimal or near optimal alignment) in step 440, as indicated by the transformation applied in step 425 having negligible difference from previous iterations, the registration process is complete and the aligned second image set is outputted from the EIRS in step 450.

In step 430, the Convergence Calculator component of the EIRS determines the magnitude of the transformations that were performed by the Transformation Optimizer 425. The EIRS measures the magnitude of transformation across several iterations by examining specific points (locations) within the image set after each translation. Which points are selected may affect the quality of the measurements. It is preferable to choose one or more points that collectively represent the extremes of movement and are most sensitive to changes in parameters. For example, when an affine transformation is applied to an image stack (e.g., a set of MRI images) the pixels at the 8 corners of the image stack are most sensitive to change and represent a good measure of movement. The points to examine may be chosen by the user or a system administrator or may be a pre-defined attribute within the system.

In step 440, the results of the Convergence Calculator 430 are tested to determine whether or not the magnitude of transformation has converged. Convergence is reached when the change in the magnitude of transformation over a pre-defined number of iterations is sufficiently small. The accuracy of the registration is determined by the magnitude of transformation that is considered to have converged, with smaller thresholds generally resulting in finer registration accuracy. The number of iterations examined and the size of the allowable change affect both the efficiency and the accuracy of the system. The preferable values provide accurate results in a timely manner. If convergence has been reached, then in step 450, the Output Transformed Image Set step, the EIRS outputs the transformed second image set. If in step 440 the results of the Convergence Calculator 430 have determined that the magnitude of transformation has not converged, the EIRS continues the iterative comparison and transformation process in step 420.

Figure 5:
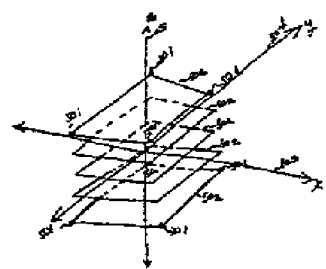
FIG. 5 is an example diagram of sample locations within an image set selected for determining the magnitude of transformation.

FIG. 5 is an example diagram of sample locations within an image set selected for determining the magnitude of transformation. In FIG. 5, individual images 502 are stacked to form an image set, which is centered on a three-dimensional coordinate system. The image set is shown, for illustrative purposes, centered on a coordinate system comprising a x-axis 503, a y-axis 504 and a z-axis 505. The eight corner points 501 are those selected in an example implementation of an EIRS as points within the image set that are most sensitive to affine transformations. This is illustrated by considering a transformation that results in a rotation of the image set about the y-axis 504. The positions of the points along the y-axis do not change, while the points within the image set that are furthest from the y-axis change location the most. The selected eight corner points 501 represent the mathematical location of the set of points furthest from the x-axis, the set of points furthest from the y-axis and the set of points furthest from the z-axis. Thus for any rotation centered around the origin, where the x-axis, y-axis and z-axis intersect, a set of the corners will have the greatest movement of any pixel within the stack. Therefore, the set of eight corner points 501 is the set of points within the example image set most sensitive to affine transformations.

Convergence is indicated when the collective position change of the eight corner points through iterative translations is significantly small. The calculation of the collective position change of the eight corner points is discussed in detail below, with reference to FIG. 7. Depending on the type of image set and the type of transformations being applied, the Convergence Calculator may choose to track other optimal locations such as a center point, points equally spaced along the faces or edges of an image set, user-selected points of interest or a set of one or more arbitrary points. One skilled in the art will recognize that determination of the magnitude of transformation may be used with other locations and with differing combinations as deemed useful.

Figure 6:
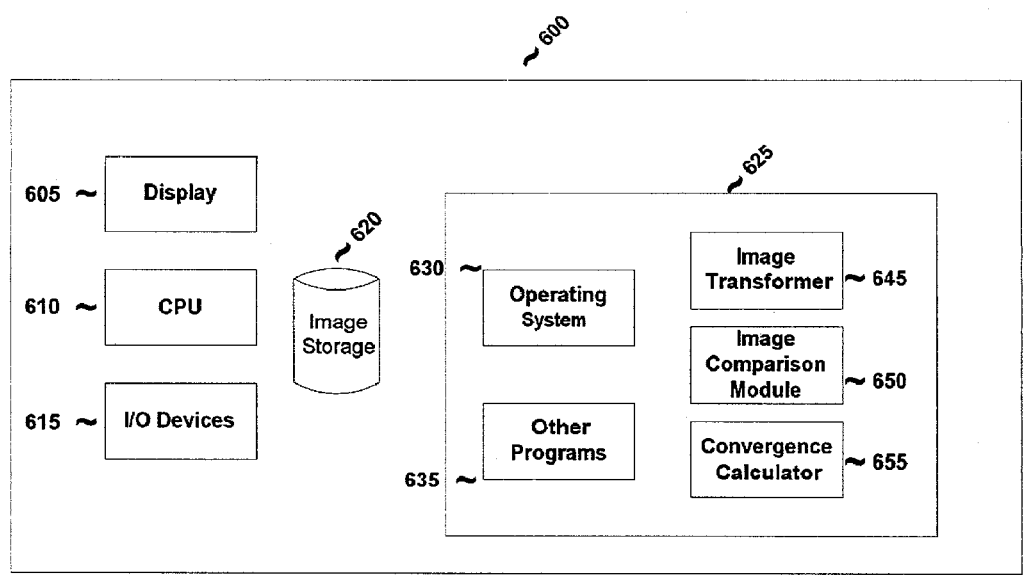
FIG. 6 is an example block diagram of a general purpose computer system for practicing embodiments of the Enhanced Image Registration System of the present invention.

FIG. 6 is an example block diagram of a general-purpose computer system for practicing embodiments of the Enhanced Image Registration System. The computer system 600 contains a central processing unit (CPU) 610, Input/Output devices 615, a display device 620, image storage 620 and memory 625. These are well known components of a computer system and will not be described further herein. The Transformation Optimizer 645, Image Comparison Module 650 and Convergence Calculator 655 of the Enhanced Image Registration System 640 preferably resides in memory 625 as software modules that make up the EIRS system, with an operating system 630 and other programs 635. One skilled in the art will recognize that the Enhanced Image Registration System may be implemented using other configurations. For example, the functions of the EIRS may be distributed differently within the components, the components of the EIRS may be configured differently or they may be distributed across multiple computer systems. Further, the different components of the EIRS and of the computer system 600 may be distributed across several computer systems and may be connected to a network, such as a local network or a remote network, including the Internet.

The example embodiment of the Enhanced Image Registration System described herein uses well-known techniques to implement certain aspects of the EIRS. As stated earlier, the convergence techniques of the methods and systems of the present invention will also operate with other well-known techniques in addition to those presented here. In one embodiment of the EIRS, affine transformations are applied to one three-dimensional image set (comprising a stack of two-dimensional images) to align it with a second three-dimensional image set (also comprising a stack of two-dimensional images). Mathematically, the affine transformations apply translations (T), rotations (R), scaling (S) and skewing (G) to a set of pixels in coordinate space X to transform them into a new coordinate space Y. To perform these transformations, R, S and G are combined into a matrix M, defined by equation (1) as follows:

$M=R*G*S$  Eq. (1)

The affine transformation between the two spaces is defined by equation (2) as follows:

$Y=M*X+T$  Eq. (2)

Figure 8:
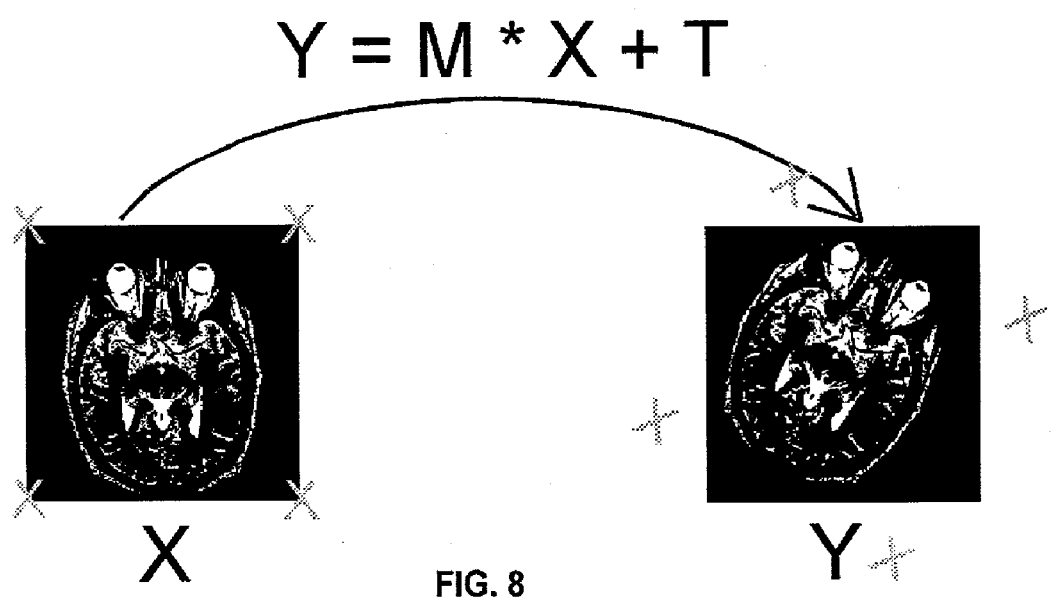
FIG. 8 depicts a translation of a 2D image of a subject's head utilizing Equation 2 of the present invention.

FIG. 8 depicts a translation of a 2D image of the head utilizing Equation 2. As described with reference to FIG. 4, the image transformer comparison performed by the Image Comparison Module 420 and the transformer (optimizer) of the EIRS can be implemented using any of the well-known techniques, such as those described in 'Multimodality image registration by maximization of mutual information and Alignment by maximization of mutual information,' which is hereby fully incorporated by reference.

The Image Comparison module 420 of one embodiment of the EIRS measures the Mutual Information for comparing images to determine whether or not they are aligned. Another embodiment further refines the computation of Mutual Information by using stochastic approximation techniques for sampling the image.

The Transformation Optimizer of one embodiment of the EIRS implements well-known gradient descent optimization techniques for determining successive transformations to apply to an image set to align it with a reference image set. The other embodiment uses standard optimization techniques such as Powell's method for determining successive transformations to apply to an image set to align it with a reference image set.

Once the image comparison and transformation steps are complete (see, for example, steps 420 and 425 of FIG. 4) the EIRS determines the magnitude of the transformation and whether the registration process has converged or converged within a predetermined range (e.g., steps 430 and 440 in FIG. 4). As described, in one embodiment, the eight corners of the image set are examined to determine the magnitude of transformation and when the alignment process is complete.

Figure 7:
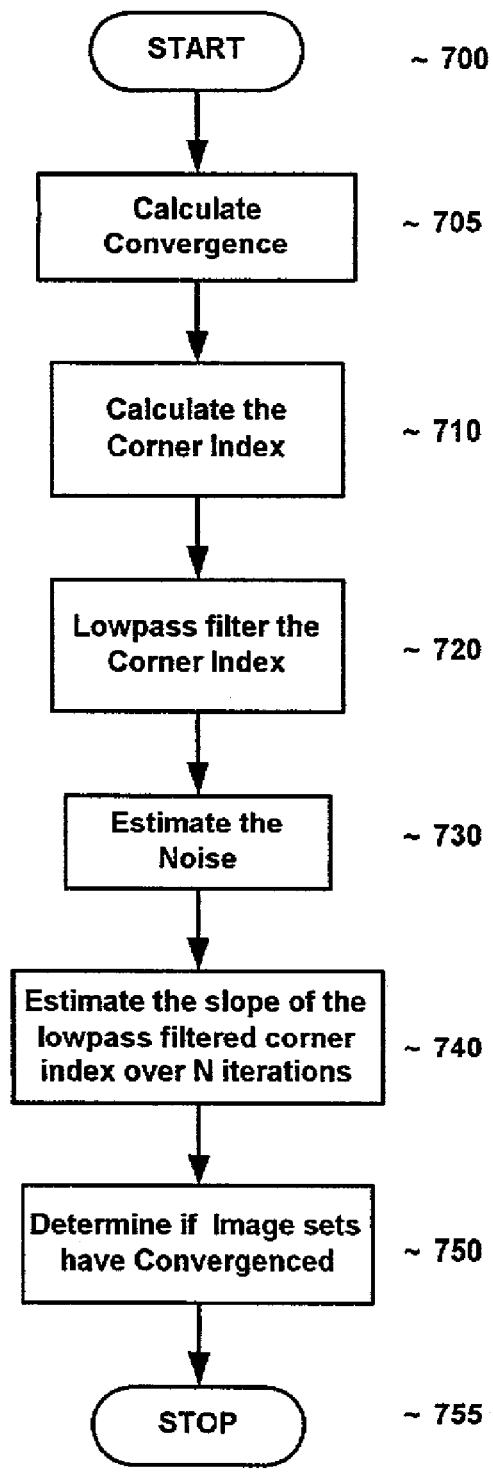
FIG. 7 is an example flow diagram of the steps performed by the calculate-convergence routine of the Convergence Calculator Component of an Enhanced Image Registration System of the present invention.

FIG. 7 is an example flow diagram of the steps 700 performed by the Convergence Calculator Component 430 of an Enhanced Image Registration System. The Convergence Calculator determines the magnitude of transformation over the pre-determined number of iterations and indicates whether or not convergence has been reached. The calculate_convergence routine 705 can be executed after each transformation, after regularly spaced transformations (e.g., every 10 iterations) or any other interval. The location of the corner points are compared to one or more reference locations. Though the reference location(s) could be any location, there are two logical reference locations that may be used. The first are the locations of the corner pixels prior to the previous transformation (or set of transformations). The second is the target location of the pixels after transformation (if known). The example embodiment uses the locations of the corner pixels prior to any transformations as the reference points.

Specifically, in step 710, the routine first calculates a corner index. The corner index is a single value that represents the movement or position of all (or a portion of) the corner points. Examples of calculated corner indices are the sum and the Root-Mean-Squared-Error (RMSE) of the distances between the corner points and the points. One skilled in the art will recognize that other equations could also be used to calculate a single value representation of the current locations of the corner points. In an example embodiment, the corner index C is calculated in equation (3) as follows:

$$C = \sqrt{\frac{1}{8}\sum_{j=1}^{8}\sum_{k=1}^{3}[X_j(k)-Y_j(k)]^2}$$  Eq. (3)

wherein X and Y are the x, y, z spatial locations of the corner points of the transformed image and the reference points (or the corner points from the untransformed image), k is used to index the x-, y- and z-components. The subscript j is used to index each of the 8 corner points. C is calculated via Eq. (3) for each iteration. In step 720, the calculate_convergence routine applies a low pass filter to the corner index to remove the noise and to provide a smooth estimate of the data The example embodiment uses a causal low-pass filter that requires only data acquired previous to the current iteration. The low-pass value of the corner index at iteration i, $C_l(i)$, is calculated using a boxcar or similar type filter of length $L_1$ is defined by equation (4) as follows:

$$C_l(i) = \frac{1}{L_l} \sum_{i-L_l}^{i} C(i) \quad \text{Eq. (4)}$$

One skilled in the art will recognize that other low-pass filters may be implemented in place of the boxcar filter, for example a Hamming, Blackman or Bartlett filter can be employed. Alternatively, convergence may be determined without the use of a low-pass filter, for example, if the generated data is relatively smooth prior to any filtering.

In step 730, the calculate_convergence routine estimates the noise. In an alternate embodiment, an estimate of the noise $C_h(i)$ is obtained from a high-pass filtered version of the corner index which is calculated by equation (5) as follows:

$$C_h(i) = \sqrt{\frac{1}{L_h} \sum_{i-L_A}^{i} [C_l(j+L_h-1) - C_j]^2} \quad \text{Eq. (5)}$$

Where $L_h$ is the window used to calculate the high-pass filter and (i) is the current iteration. The calculated noise is used, as discussed below with respect to equation 7, to insure that tested levels of convergence are not below the detectible range due to measurement noise. In step 740, the calculate_convergence routine estimates the slope estimate of the slope of the low pass filtered corner index $C_m(i)$ is calculated over a window (a number of iterations) of length $L_2$ by equation (6) as follows:

$$C_m(i) = (C_l(i) - C_l(i - L_2))/L_2 \quad \text{Eq. (6)}$$

A minimum number of iterations, $L_5$, may be required before entering the convergence_routine or before conducting some of the steps in the convergence_routine such as steps 720, 730 and 740. This is because it may be desired for the system to either conduct a minimum number of iterations for performance reasons or because a certain minimum number of iterations are needed to calculate the values in Eq. (4), (5) and (6). Once this minimum set of iterations has been reached the process proceeds to step 750.

In step 750, the calculate_convergence routine determines whether or not convergence of the magnitude of transformation has been reached. Generically convergence occurs when the convergence value (V) is less than some threshold such that V<t. In the present embodiment, the point of convergence occurs at the current iteration (i) when the following criteria of equation (7) are met:

$$abs(C_m(i)) < f_1 + C_h(i)*f_2 \text{ (for every i from } i-L_3 \ldots \text{ to i)} \quad \text{Eq. (7)}$$

wherein the abs( ) function is the absolute value and is applied because only the magnitude of the slope is considered not the direction of the slope. The $f_1$ term is the maximum slope that can exist and the system still be considered to have converged. The $(C_h(i)*f_2)$ term is a minimum threshold of the noise and is used to ensure that differences seen in the slope are not a result of the noise. The $f_2$ term is a safety factor used to increase the noise floor above one standard deviation. This inequality must hold for $L_3$ iterations in order to flag convergence. This ensures that the slope has converged and is not a result of a local maximum or minimum of $C_l(i)$. The window lengths $L_1$, $L_2$, $L_3$ and the factors $f_1$ and $f_2$ are configurable.

Thus relating back to the generic convergence system V<t, in this implementation V=abs($C_m(i)$) and t=$f_1 + C_h(i)*f_2$.

An alternative embodiment of the present invention instead of requiring $L_3$ consecutive iterations to be performed meeting the conditions of Eq. (7), would require $L_3$ iterations over a period of $L_4$ iterations where $L_3 \leq L_4$ to be performed This embodiment would also require that the generic convergence be modified by requiring that the condition V<t be met for a defined period of iterations.

Table 1 below is a summary of variables used in Eqs. (3)–(7) above and provides example values that may be used for the configurable variables, $L_1$, $L_2$ and $L_3$ and the factors $f_1$ and $f_2$.

TABLE 1

Summary of Variables

| Variable | Value | Description |
|---|---|---|
| i | | iteration of algorithm |
| C(i) | calculated | Corner index at iteration i |
| $C_l(i)$ | calculated | Low pass value of corner index at iteration i |
| $C_h(i)$ | calculated | Noise estimate at iteration i |
| $L_1$ | 251 | Low pass filterlength |
| $L_h$ | $(L_1 - 1)/2 + 1$ | Noise estimate filter length |
| $L_2$ | $L_1$ | Number of iterations between 2 points used to calculate slope |
| $C_m(i)$ | calculated | Slope between $C_l(i)$ and $C_l(i - L_2)$ |
| $L_3$ | .75 * $L_1$ | Number of iterations that must meet convergence requirement before stopping algorithm. |
| $L_4$ | $L_3$ | Period in which the $L_3$ iterations must occur to meet the convergence requirement before stopping the algorithm. Because $L_3 = L_4$, the $L_3$ iterations must occur consecutively. |
| $L_5$ | $L_1$ | Minimum number of iterations before commencing the calculation of convergence (should be the maximum of $L_1$, $L_2$ and $L_3$). |
| $f_1$ | .0003 | Minimum slope that still indicates movement towards convergence |
| $f_2$ | 1.0 | Noise multiplier |
| V | Abs($C_m(i)$) | Convergence Value in generic convergence test. |
| t | $f_1 + C_h(i) * f_2$. | Convergence threshold in generic convergence test. |

Figure 9:
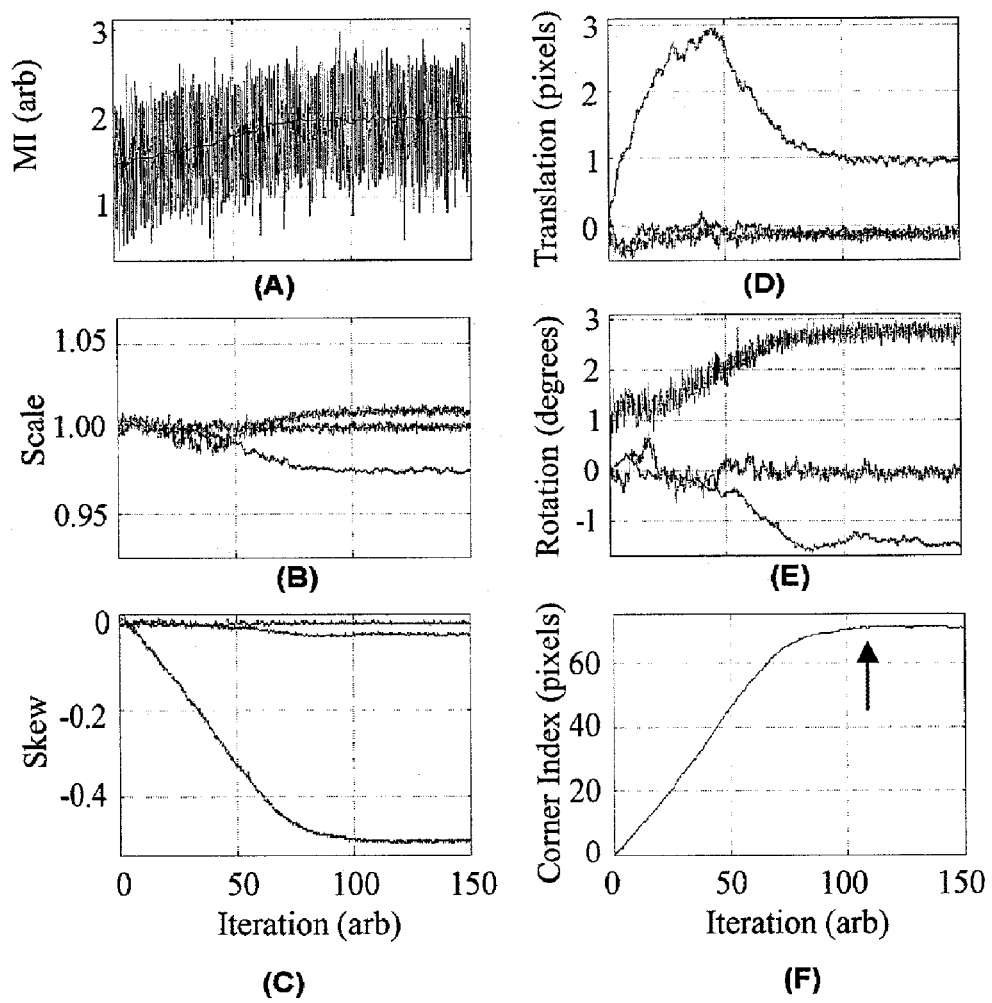
FIG. 9(A) depicts measurement and plotting of the mutual information (MI) over a number of iterations.
FIG. 9(B) depicts scaling of the evaluation image in the x, y and z directions.
FIG. 9(C) depicts skewing of the evaluation image in the x, y and z directions.
FIG. 9(D) depicts translation of the evaluation image in the x, y and z directions.
FIG. 9(E) depicts rotation of the evaluation image around the x, y and z axis, as shown in FIG. 5.
FIG. 9(F) depicts movement of the corner index (C) as calculated by Equation 4 of the present invention.

FIGS. 9(A) through 9(F) illustrate the implementation of the EIRS and the utility of the methods. FIG. 9(A) depicts the measurement of the mutual information (MI) over the iterations of the algorithm. Because of the stochastic implementation used to calculate MI the measure is very noisy, making it impossible without the use of a large windowed low-pass filter to determine the point of convergence. Examination of the individual components of the affine transformation are shown for scaling in the x, y and z directions, as shown in FIG. 9B for skewing of the x, y and z components, as shown in FIG. 9C, for translation in the x, y and z direction, as shown in FIG. 9D and for rotation around the x, y and z axis, as shown in FIG. 9E. It should be noted that each of these single component plots are noisy and convergence of one component does not indicate convergence of the other components. For example, some of the components converge early while others continue convergence much later. On the other hand, the "corner index", as shown in FIG. 9F, is much smoother and the point of convergence is easily identified as occurring near the arrow of FIG. 9F. Thus, using the EIRS the point of convergence can be easily determined and the system stopped accordingly.

From the foregoing it will be appreciated that, although specific embodiments of and examples for the present invention are described herein for purposes of illustration, various modifications may be made without deviating from the spirit and scope of the invention and equivalent methods, structures, processes, steps and other modifications within the spirit of the invention fall within the scope for the invention. For example, one skilled in the art will recognize that the methods and systems discussed herein are applicable to image registration in any number of dimensions and are not limited to three dimensions. Also, the registration process is not limited to two image sets, but could be used to align three or more image sets. One skilled in the art will also recognize that registration may be performed using image sets that comprise one or more images and that images may include various data formats, not limited to graphical images. One skilled in the art will also recognize that the equations detailed in this description may be substituted to make the calculations used to compare locations of specific points and determine convergence and yet still remain within the teachings of the present invention. One skilled in the art will also recognize that the methods and systems discussed herein for determining convergence are applicable to determining convergence in many different optimization systems and are not limited to image registration.

It will be apparent to those skilled in the art that various modifications and variations can be made in the System and Method for Determining Convergence of Image Sets of the present invention and in construction of this invention without departing from the scope or intent of the invention.

Other embodiments of the invention will be apparent to those skilled in the art from consideration of the specification and practice of the invention disclosed herein. It is intended that the specification and examples be considered as exemplary only, with a true scope and teachings of the invention being indicated by the following claims.

The invention claimed is:

1. A method for registering a plurality of image sets, wherein each of the plurality of image sets comprises at least one image, and wherein each of the plurality of image sets contain spatially overlapping areas of an imaged subject with at least one of the remaining plurality of the image sets, the method comprising:
   selecting a reference image set and an evaluation image set from said plurality of image sets, wherein the evaluation image set is to be aligned with the reference image set;
   selecting a methodology for comparing of the registration between the reference image set and the evaluation image set;
   selecting one or more point locations on the evaluation image set for tracking image movement;
   selecting one or more fixed reference points for comparison with the one or more point locations on the evaluation image set;
   selecting type of transformation to apply to the evaluation image set for aligning the evaluation image set with the reference image set;
   a) calculating quality of alignment between the reference image set and the evaluation image set using a selected quality of alignment methodology;
   b) calculating a location value (C) from one or more points on the evaluation image set with respect to the selected one or more fixed reference points and storing the calculation in a memory;
   c) calculating a next transformation to apply to the evaluation image;
   d) applying the transformation to at least a subset of the evaluation image set;
   e) calculating a convergence value (V) for the current iteration (i), and storing the convergence value to the memory;
   f) performing steps (a), (b) (c), (d) and (e) until at least a predetermined number N of correspondence calculation iterations have been performed; and
   g) repeating steps (a), (b), (c), (d), and (e) if a total number of iterations (i) performed $\leq N$ and the convergence value $(V) \leq (t)$, wherein (t) is a threshold value that is dynamically determined using a high-pass estimate of (V) to determine a noise level $C_h(i)$.

2. The method for registering a plurality of image sets according to claim 1, wherein calculating the quality of alignment further includes calculating Mutual Information between the reference image set and the evaluation image set.

3. The method for registering a plurality of images sets according to claim 2, wherein the Mutual Information calculation further includes Stochastic sampling to compute the Mutual Information.

4. The method for registering a plurality of image sets according to claim 3, wherein the convergence value (V) for each iteration (i) is defined as a slope over the last $L_2$ iterations as $V(i)=C(C(i)-C(i-L_2))/L_2$ wherein $L_2$ is a number of iterations between two points used to calculate slope.

5. The method for registering a plurality of image sets according to claim 2, wherein the image sets to be registered are capable of differing in at least one of temporally, modality, acquisition orientation, and dimensionality.

6. The method for registering a plurality of image sets according to claim 5, wherein the transformation of the evaluation image set is one of affine, rigid, deformable and perspective.

7. The method for registering a plurality of image sets according to claim 1, wherein the image sets to be registered are capable of differing in at least one of temporally, modality, acquisition orientation, and dimensionality.

8. The method for registering a plurality of image sets according to claim 1, wherein the selecting of point locations includes selecting corner points of the evaluation image set as the selected location points.

9. The method for registering a plurality of image sets according to claim 1, further including using selected corner points of the evaluation image set before the initial transformation as the fixed reference locations.

10. The method for registering a plurality of image sets according to claim 1, wherein the location value (C) is an average distance between the one or more selected point(s) at the current iteration and the one or more fixed reference locations.

11. The method for registering a plurality of image sets according to claim 10, wherein the convergence value (V) for each iteration (i) is defined as a slope over the last $L_2$ iterations as $V(i)=(C(i)-C(i-L_2))/L_2$ wherein $L_2$ is a number of iterations between two points used to calculate slope.

12. The method for registering a plurality of images sets according to claim 11, wherein convergence is obtained when absolute value of $(V) \leq t$ for at least $L_3$ of the last $L_4$ iterations such that $L_3 \leq L_4$ wherein $L_3$ is a number of iterations that must meet a convergence requirement before stopping the calculation and $L_4$ is a period in which $L_3$ iterations must occur to meet the convergence requirement.

13. The method for registering a plurality of image sets according to claim 1, wherein the convergence value (V) is calculated from the location values (C).

14. The method for registering a plurality of image sets according to claim 13, wherein location value (C) is low pass filtered to remove noise.

15. The method for registering a plurality of image sets according to claim 1, wherein location value (C) is low pass filtered to remove noise.

16. The method for registering a plurality of image sets according to claim 15, wherein the low-passed filter is defined as $$C_l(i) = \frac{1}{L_{fi_{Li}}} C(i)$$

wherein $L_1$ is the length of the low-pass filter.

17. The method for registering a plurality of image sets according to claim 1, wherein the convergence value (V) for each iteration (i) is defined as a slope over the last $L_2$ iterations as $V(i)=(C(i)-C(i-L_2))/L_2$ wherein $L_2$ is a number of iterations between two points used to calculate slope.

18. The method for registering a plurality of images sets according to claim 1, wherein convergence is obtained when absolute value of $(V) \leq t$ for at least $L_3$ of the last $L_4$ iterations such that $L_3 \leq L_4$ wherein $L_3$ is a number of iterations that must meet a convergence requirement before stopping the calculation and $L_4$ is a period in which $L_3$ iterations must occur to meet the convergence requirement.

19. The method for registering a plurality of image sets according to claim 1, wherein the transformation of the evaluation image set is one of affine, rigid, deformable, and perspective.

20. The method for registering a plurality of image sets according to claim 1, wherein the transformation applied to the evaluation image set is determined by an optimization method.

21. The method for registering a plurality of image sets according to claim 20, wherein calculating correspondence further includes at least one of a Powell's method optimizer, a steepest gradient descent optimizer, a LBFGS optimizer, a Levenberg-Marquardt optimizer, a conjugate gradient optimizer, and a quasi-Newton optimizer.

22. The method for registering a plurality of image sets according to claim 1, wherein an image set comprises one or more images.

23. The method for registering a plurality of image sets according to claim 22, wherein the image set comprises data relating to functional measurements.

24. The method for registering a plurality of image sets according to claim 22, wherein the image set comprises data relating to anatomical data.

25. The method for registering a plurality of image sets according to claim 1, wherein the image set comprises data relating to functional measurements.

26. The method for registering a plurality of image sets according to claim 1, wherein the image set comprises data relating to anatomical data.

27. The method for registering a plurality of image sets according to claim 1, wherein the convergence threshold is defined as $t=f_1+C_h(i)*f_2$.

28. The method for registering a plurality of image sets according to claim 1, wherein the quality of alignment is voxel based.

29. The method for registering a plurality of image sets according to claim 28, wherein the voxel based quality of alignment is further based on intensity of pixels of the image.

30. The method for registering a plurality of image sets according to claim 29, wherein Mutual Information is utilized to determine quality of alignment.

31. The method for registering a plurality of image sets according to claim 30, wherein Mutual Information further includes stochastic approximation.

32. The method for registering a plurality of image sets according to claim 1, wherein the quality of alignment is feature based.

33. The method for registering a plurality of image sets according to claim 32, wherein the feature based quality of alignment is further based on edges extracted from the image.

34. A system for registering a plurality of image sets, wherein each of the plurality of image sets comprises at least one image, and wherein each of the plurality of image sets contain spatially overlapping areas of an imaged subject with at least one of the remaining plurality of the image sets, the system comprising:

means for selecting a reference image set and an evaluation image set from said plurality of image sets, wherein the evaluation image set is to be aligned with the reference image set;

means for selecting a methodology for comparing the registration between the reference image set and the evaluation image set;

means for selecting one or more point locations on the evaluation image set for tracking image alignment;

means for selecting one or more fixed reference points for comparison with the one or more point locations on the evaluation image set;

means for selecting type of transformation to apply to the evaluation image set for aligning the evaluation image set with the reference image set;

a) means for calculating quality of alignment between the reference image set and the evaluation image set using the selected feature set;

b) means for calculating a location value (C) from one or more points on the evaluation image set with respect to the selected one or more fixed reference points and storing the calculation in the memory;

c) means for calculating a next transformation to apply to the evaluation image;

d) applying the transformation to at least a subset of the evaluation image set;

e) means for calculating a convergence value (V) for the current iteration (i), and storing the convergence value to the memory;

f) means for performing steps (a), (b) (c), (d) and (e) until at least $L_5$ correspondence calculation iterations have been performed wherein $L_5$ is a minimum number of iterations before commencing the calculation of convergence;

g) repeating steps (a), (b), (c), (d), and (e) if a total number of iterations (i) performed $\leq N$ and the convergence value $(V) \leq (t)$, wherein (t) is a threshold value that is dynamically determined using a high-pass estimate of (V) to determine a noise level $C_h(i)$.

35. The system for registering a plurality of image sets according to claim 34, wherein calculating correspondence further includes calculating Mutual Information between the reference image set and the evaluation image set.

36. The system for registering a plurality of images sets according to claim 35, wherein the Mutual Information calculation further includes Stochastic sampling to compute the Mutual Information.

37. The system for registering a plurality of image sets according to claim 35, wherein the image sets to be registered are capable of differing in at least one of temporally, modality, acquisition orientation, and dimensionality.

38. The system for registering a plurality of image sets according to claim 37, wherein the transformation of the evaluation image sat is capable of being limited to one of affine, rigid and deformable.

39. The system for registering a plurality of image sets according to claim 34, wherein the image sets to be registered are capable of differing in at least one of temporally, modality, acquisition orientation, and dimensionality.

40. The system for registering a plurality of image sets according to claim 34, wherein the calculating location step further includes selecting corner points of the evaluation image set as the selected location points.

41. The system for registering a plurality of image sets according to claim 34, further including using selected corner points of the evaluation image set as the fixed reference locations before the initial transformation.

42. The system for registering a plurality of image sets according to claim 34, wherein the location value (C) is an average distance between the one or more selected point(s) at the current iteration and the one or more fixed reference locations.

43. The system for registering a plurality of image sets according to claim 34, wherein the convergence value (V) is calculated from the location value (C).

44. The system for registering a plurality of image sets according to claim 34, wherein location value (C) is low pass filtered to remove noise.

45. The system for registering a plurality of image sets according to claim 34, wherein the convergence value (V) for each iteration (i) is defined as a slope over the last M iterations as V(i)=(C(i)−C(i−M))/M wherein M is a number of iterations between two points used to calculate slope.

46. The system for registering a plurality of images sets according to claim 45, wherein convergence is obtained when absolute value of (V)≦t for at least Q of the last L iterations such that Q≦L wherein Q is a number of iterations that must meet a convergence requirement before stopping the calculation and L is a period in which Q iterations must occur to meet the convergence requirement.

47. The system for registering a plurality of image sets according to claim 34, wherein the transformation of the evaluation image set is capable of being limited to one of affine, rigid and deformable.

48. The system for registering a plurality of image sets according to claim 34, wherein an image set comprises one or more images.

49. The system for registering a plurality of image sets according to claim 34, wherein the image set comprises data relating to functional measurements.

50. The system for registering a plurality of image sets according to claim 34, wherein the image set comprises data relating to anatomical data.

51. The system for registering a plurality of image sets according to claim 34, wherein the calculation of the convergence threshold (t) is dynamically determined based on the data.

52. A software product capable of directing a general purpose computer to register a plurality of image sets, wherein each of the plurality of image sets contain spatially overlapping areas of an imaged subject with at least one of the remaining plurality of the image sets, the software product comprising:
   directing a general purpose computer to execute the steps of:
   selecting a reference image set and an evaluation image set from said plurality of image sets, wherein the evaluation image set is to be aligned with the reference image set;
   selecting a methodology for comparing the registration between the reference image set and the evaluation image set;
   selecting one or more point locations on the evaluation image set for tracking image alignment;
   selecting one or more fixed reference points for comparison with the one or more point locations on the evaluation image set;
   selecting type of transformation to apply to the evaluation image set for aligning the evaluation image set with the reference image set;
   a) calculating quality of alignment between the reference image set and the evaluation image set using the selected feature set;
   b) calculating a location value (C) from one or more points on the evaluation image set with respect to the selected one or more fixed reference points and storing the calculation in the memory;
   c) calculating a next transformation to apply to the evaluation image;
   d) applying the transformation to at least a subset of the evaluation image set;
   e) calculating a convergence value (V) for the current iteration (i), and storing the convergence value to the memory;
   f) performing steps (a), (b) (c), (d) and (e) until at least $L_5$ correspondence calculation iterations have been performed;
   g) repeating steps (a), (b), (c), (d), and (e) if a total number of iterations (i) performed ≦N and the convergence value (V)≦(t), wherein (t) is a threshold value that is defined as $t=f_1+C_h(i)*f_2$.

53. A system for registering image sets, the system comprising:
   a data processor, the data processor having a memory, wherein the data processor is capable of accessing and directing peripheral devices;
   a graphical user interface, wherein the graphical user interface is capable of interfacing with an navigating an imaging registration software product for registering image sets and wherein the software product is capable of instructing the data processor to perform instructions pursuant to the software product, the software product comprises:
   an instruction for selecting a reference image set and an evaluation image set from said plurality of image sets, wherein the evaluation image set is to be aligned with the reference image set;
   an instruction for selecting a methodology for comparing the registration between the reference image set and the evaluation image set;
   an instruction for selecting one or more point locations on the evaluation image set for tracking image alignment;

an instruction for selecting one or more fixed reference points for comparison with the one or more point locations on the evaluation image set;
an instruction for selecting type of transformation to apply to the evaluation image set for aligning the evaluation image set with the reference image set;
a) an instruction for calculating quality of alignment between the reference image set and the evaluation image set using the selected feature set;
b) an instruction for calculating a location value (C) from one or more points on the evaluation image set with respect to the selected one or more fixed reference points and storing the calculation in the memory;
c) an instruction for calculating a next transformation to apply to the evaluation image;
d) an instruction for applying the transformation to at least a subset of the evaluation image set;
e) an instruction for calculating a convergence value (V) for the current iteration (i), and storing the convergence value to the memory;
f) an instruction for performing steps (a), (b) (c), (d) and (e) until at least predetermined number of correspondence calculation iterations have been performed;
g) an instruction for repeating steps (a), (b), (c), (d), and (e) if a total number of iterations (i) performed $\leq N$ and the convergence value $(V) \leq (t)$, wherein (t) is a threshold value that is dynamically determined using a high-pass estimate of (V) to determine a noise level $C_h(i)$.

* * * * *